June 10, 1969
B. O'REILLY
3,448,509
PROCESSES OF REMOVING PLASTIC INSULATION FROM WIRES AND
OF CONTROLLING GASES RESULTING THEREFROM
Filed Feb. 5, 1964
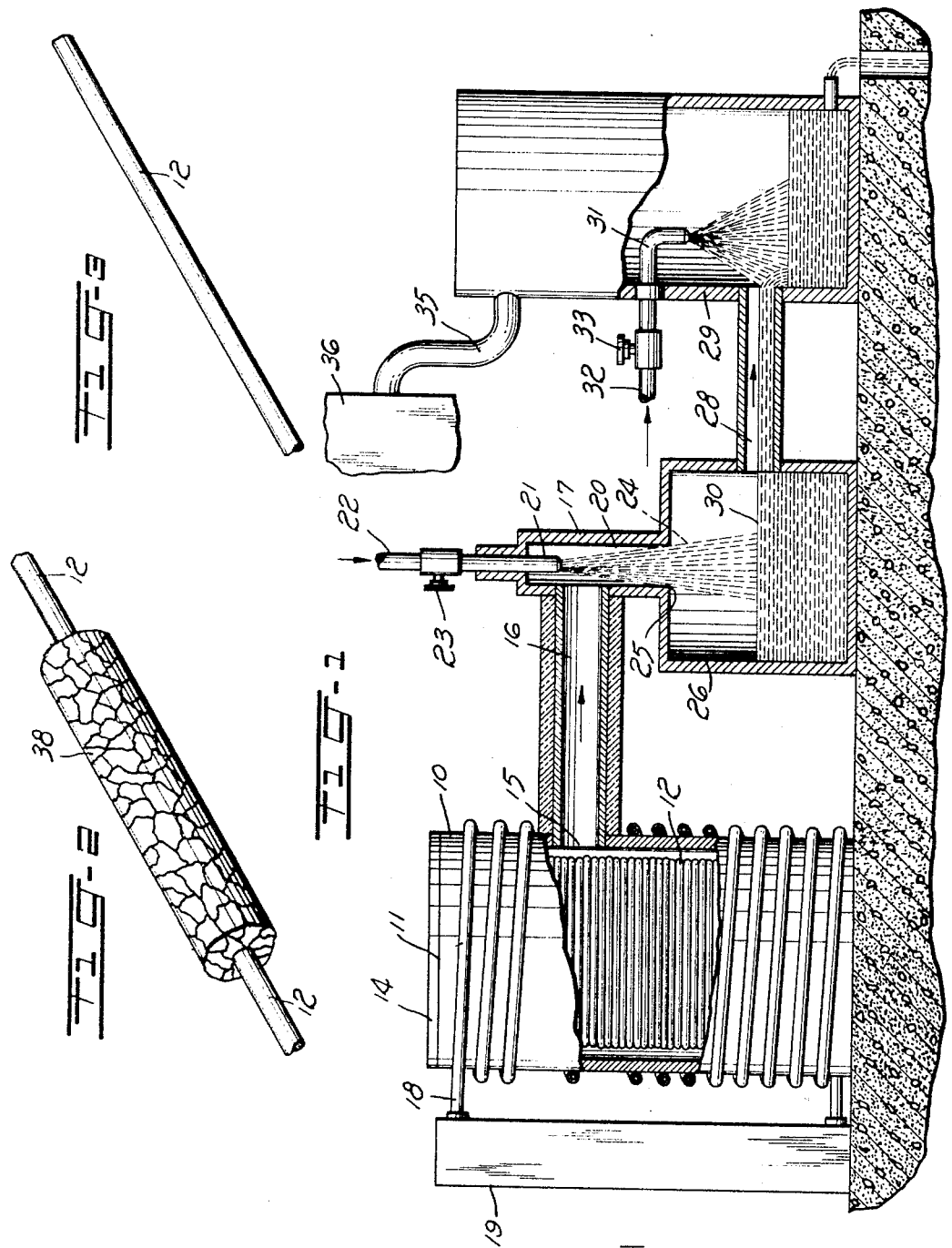
INVENTOR
B. O'REILLY
BY *W.T. Johnson*
ATTORNEY United States Patent Office 3,448,509
Patented June 10, 1969

3,448,509
PROCESSES OF REMOVING PLASTIC INSULATION FROM WIRES AND OF CONTROLLING GASES RESULTING THEREFROM
Bernard O'Reilly, Staten Island, N.Y., assignor, by mesne assignments, to Nassau Smelting and Refining Company, Inc., Tottenville, N.Y., a corporation of New York
Filed Feb. 5, 1964, Ser. No. 342,710
Int. Cl. B01d 5/00; B08d 3/00
U.S. Cl. 29—403                                   13 Claims

ABSTRACT OF THE DISCLOSURE

A quantity of plastic-insulated wire is placed in a chamber which is then sealed air-tight both to enclose the chamber and to limit the amount of air therein. The wire is heated to a temperature sufficient to reduce the plastic to a crisp residue and to evolve gases from the plastic. The evolved gases are wet-scrubbed to remove obnoxious constituents therefrom. The heating step alone and in combination with the scrubbing step effects the reclamation of unoxidized wire and the control of the evolved gases. The crisp residue is ultimately removed.

BACKGROUND OF THE INVENTION

Field of the invention

This invention relates to processes of removing insulation, particularly plastic insulation, from wires and to controlling the gases resulting from such processes.

SUMMARY OF THE INVENTION

The greatest problem regarding the reclaiming of conductor wires does not lie in the initial step of removing insulation, particularly plastic insulation therefrom, but in controlling the gases resulting from such processes. The gases evolved through distillation of certain plastic insulations contain acid and other obnoxious constituents which must be reduced to tolerable levels before they can be released to the atmosphere.

An object of the invention is a process of removing plastic insulation from wire and reducing the obnoxious constituents resulting therefrom to tolerable levels.

In accordance with the object the process includes heating the insulated wire in an air-sealed chamber, having a gas outlet, until the plastic is reduced to a crisp residue and the resulting gases are distilled therefrom and, then, scrubbing the gases with water after leaving the outlet until the obnoxious constituents in the gases are reduced to tolerable levels.

Other objects and advantages will be apparent from the following detailed description when considered in conjunction with the accompanying drawings wherein:

BRIEF DESCRIPTION OF THE DRAWINGS

FIG. 1 is a schematic illustration of a structure by the aid of which certain of the steps of the process may be practiced;

FIG. 2 is an isometric view of a portion of an insulated wire after its treatment in the structure shown in FIG. 1; and FIG. 3 is an isometric view of the wire after the insulation has been removed.

DETAILED DESCRIPTION

The term plastic, in this instance, is to cover specifically polyvinyl chloride and polyvinyl acetate. In FIG. 1 the apparatus selected to carry out certain of the steps of the process includes a chamber 10 having a top 11 which may be opened to position a supply of insulated wire 12 therein, the chamber being sealed air-tight by a cover 14 when the load of insulated wire is disposed therein. The chamber 10, after being sealed, has only one outlet that being identified as a gas outlet 15 through a passageway 16 to a scrubbing unit 17. The chamber 10 is heated to a desired temperature by a heating coil 18 having its ends connected to a control unit 19 which may be set to create a predetermined temperature in the chamber.

The scrubbing unit 17 has a narrow entrance portion 20 in which a spray nozzle 21 for water at fifteen pounds per square inch is directed through the nozzle 21 from a supply line 22 through a valve 23. The nozzle 21 is so constructed that the spray of water 24 will fill an outlet 25 leading into a larger portion 26 of the unit 17. Another washing portion 28 leads from the larger portion 26 of the unit 17 to another scrubbing unit 29 serving to wash the gases leaving the unit 17 and controlling a level 30 for the water in the unit 17. The scrubbing unit 29 is provided with a nozzle 31 to receive water at fifteen pounds per square inch from a supply line 32 through a valve 33 and direct a spray toward the outlet end of the member 28. This causes a final scrubbing of the gases to take place as they enter the unit 29 and before they leave the unit through a pipe 35 to a stack 36 and out into the atmosphere.

The chamber 10 may be heated internally to any temperature desired to complete distillation of the volatile constituents in the particular plastic insulation on the insulated wire 12 placed in the chamber. Of the two plastics specified the temperature may range from 400° to 1000° F., or from 204° to 538° C. The volatilized products are mainly tars, hydrogen chloride and phthalic anhydride. The heating step takes approximately one hour and during this interval the above products are driven from the plastic insulation leaving a crisp residue 38 of the condition illustrated in FIG. 2 with all of the aforementioned products driven therefrom in the affluent gases. As these gases are distilled from the plastic insulation they pass through the passageway 16 and into the scrubbing unit 17. As they move through the scrubbing unit 17, particularly the spray of water 24, the tars are precipitated from the gas and form globules which drop into the water in the enlarged portion 26 in the unit 17 and float to the surface thereof. These globules of tar move on the surface of the water through the member 28 and into the scrubbing unit 29. The unit 17 is described as the main step of removing tar from the gases, which is true with the exception that at this time, some of the hydrogen chloride may be removed as hydrochloric acid and there may remain a very small percentage of tar which will be removed from the gas when entering the scrubbing unit 29. The member 28 is primarily aimed at reducing the hydrogen chloride content while the final scrubbing unit 29 is utilized to reduce the hydrogen chloride content in the gas to zero.

Up to now no mention has been made as to what happens to phthalic anhydride during the scrubbing operation to which the gases are subjected. Some of the phthalic anhydride is soluble in water, but some is known to be rather stubborn and not amenable to being scrubbed. Therefore, a valued percentage of phthalic anhydride is removed by the scrubbing steps, the remaining being burned out in the stack 36 by a high velocity oil burner.

After the first series of steps of heating the insulated or plastic covered wire in the sealed chamber until the plastic is reduced to a crisp residue 38 and the gases evolved through distillation are scrubbed to remove the obnoxious constituents or to reduce them to tolerable levels, the chamber 10 is opened to remove the wire with the residue of the insulation and conveyed to a shaker screen immediately. The residue being crisp falls from the wire and passes through the screen to a pit. Due to the fact that the residue may be extremely flammable the pit will be filled with water. Furthermore, the wire in this instance being copper has been found to contain lead and for this reason, the wire is sprayed to clean the wire more completely and reduce its lead content.

The scrubbing unit 29 may be constructed so that after each treating process the remaining tars on the surface of the water may be removed.

It is to be understood that the above described arrangements are simply illustrative of the application of the principles of the invention. Numerous other arrangements may be readily devised by those skilled in the art which will embody the principles of the invention and fall within the spirit and scope thereof.

What it claimed is:

1. The process of removing plastic insulation from wire and of controlling gases resulting therefrom, which process comprises:
   heating the insulated wire in an air tight chamber, having a gas outlet, until the plastic is reduced to a crisp residue and the resulting gases distilled therefrom, and
   scrubbing the gases with water after leaving the outlet until obnoxious constituents in the gases are reduced to tolerable levels.

2. The process of removing plastic insulation from wire and of controlling gases resulting therefrom, which process compromises:
   heating the plastic insulated wire in an air tight chamber, having a gas outlet, until the plastic insulation is reduced to a crisp residue and the resulting gases distilled therefrom have escaped through the outlet,
   scrubbing the gases with a water spray to remove tars therefrom, and
   subsequently scrubbing the gases with another water spray to remove other obnoxious constituents from the gases before they are freed to the atmosphere.

3. The process according to claim 2 comprising the further step of:
   removing the wire and residue thereon from the heating chamber and shaking the wire and residue over a screen until the crisp residue falls from the wire through the screen.

4. The process according to claim 2 comprising the further steps of:
   removing the wire and residue thereon from the heating chamber and shaking the wire and residue over a screen until the crisp residue falls from the wire through the screen, and
   causing the residue to drop into a container of water beneath the screen.

5. The process according to claim 2 in which the wire contains lead and the residue which is highly flammable, which process comprises the further steps of:
   removing the wire from the heating chamber and then shaking the wire over a screen where the crisp residue falls from the wire through the screen, spraying water over the wire to clean the wire and reduce the lead content thereof, and
   causing the residue to drop into a container of water.

6. The process according to claim 1 comprising:
   heating the insulated wire in a temperature range from 400° to 1000° F.

7. A process for reclaiming wire by removing the outer plastic insulation sheath therefrom comprising:
   heating said insulated wire in a region sealed against an inflow of air and at a temperature sufficient to evolve gases from said insulation to render said insulation to a crisp residue, and separating said residue from said wire.

8. The process according to claim 7 which further comprises:
   maintaining said temperature within a range of 204° to 538° centigrade.

9. A process for reclaiming wire by removing the outer plastic insulation sheath therefrom comprising:
   heating said insulated wire in an air-tight region at a temperature sufficient to evolve gases from said insulation without ignition of said insulation and to render said insulation to a crisp residue, and then separating said residue from said wire.

10. A process for reclaiming wire by removing the outer plastic insulation sheath therefrom comprising:
    heating said insulated wire in a region sealed against an inflow of air and at a temperature sufficient to evolve gases from said insulation to reduce said insulation to a residue, and
    exhausting said evolved gases from said region.

11. A process as defined in claim 10 further including:
    separating said residue from said wire.

12. A process for reclaiming wire by removing the outer plastic insulation sheath therefrom comprising:
    heating said insulated wire in an air tight region at a temperature sufficient to evolve gases from said insulation without igniting said insulation to reduce said insulation to a residue, and
    exhausting said evolved gases from said region.

13. A process as defined in claim 12 further including:
    separating said residue from said wire.

References Cited
UNITED STATES PATENTS

| | | | |
|---|---|---|---|
| 1,844,892 | 2/1932 | Miller | 203—39 X |
| 3,061,622 | 10/1962 | Fiala | 203—42 X |
| 3,116,545 | 1/1964 | Brown | 29—403 |

THOMAS H. EAGER, *Primary Examiner.*

U.S. Cl. X.R.

134—2, 19; 203—42